United States Patent
Adams et al.

[15] 3,665,217
[45] May 23, 1972

[54] FLIGHT CONTROL DISABLING SYSTEM

[72] Inventors: Don L. Adams, Fairfield, Conn.; Nicholas Allen, Bedford, Mass.

[73] Assignee: United Aircraft Corporation, East Hartford, Conn.

[22] Filed: Dec. 29, 1969

[21] Appl. No.: 888,585

[52] U.S. Cl. ...................307/235, 244/77 M, 307/219, 307/242, 328/138, 328/146
[51] Int. Cl. .................................H03k 5/153, G06f 11/08
[58] Field of Search............244/77 M, 77 S, 77 N; 307/235, 307/230, 233, 243, 204, 219, 239, 240; 328/129, 131, 130, 138, 146, 147, 148, 149, 150, 154, 173

[56] References Cited
UNITED STATES PATENTS

| | | | |
|---|---|---|---|
| 3,482,234 | 12/1969 | Doniger et al. | 328/148 X |
| 2,987,653 | 6/1961 | Prapis | 328/146 X |
| 3,351,315 | 11/1967 | Carson et al. | 244/77 M |

Primary Examiner—Donald D. Forrer
Assistant Examiner—L. N. Anagnos
Attorney—Shenier & O'Connor

[57] ABSTRACT

A flight control disabling system operates by measuring the amplitude and frequency of control signals in the various flight control channels of the system. If in any channel there develops an oscillatory control signal exceeding a certain amplitude and lying within a predetermined frequency band, then either that channel alone or the entire flight control system is disabled.

16 Claims, 3 Drawing Figures

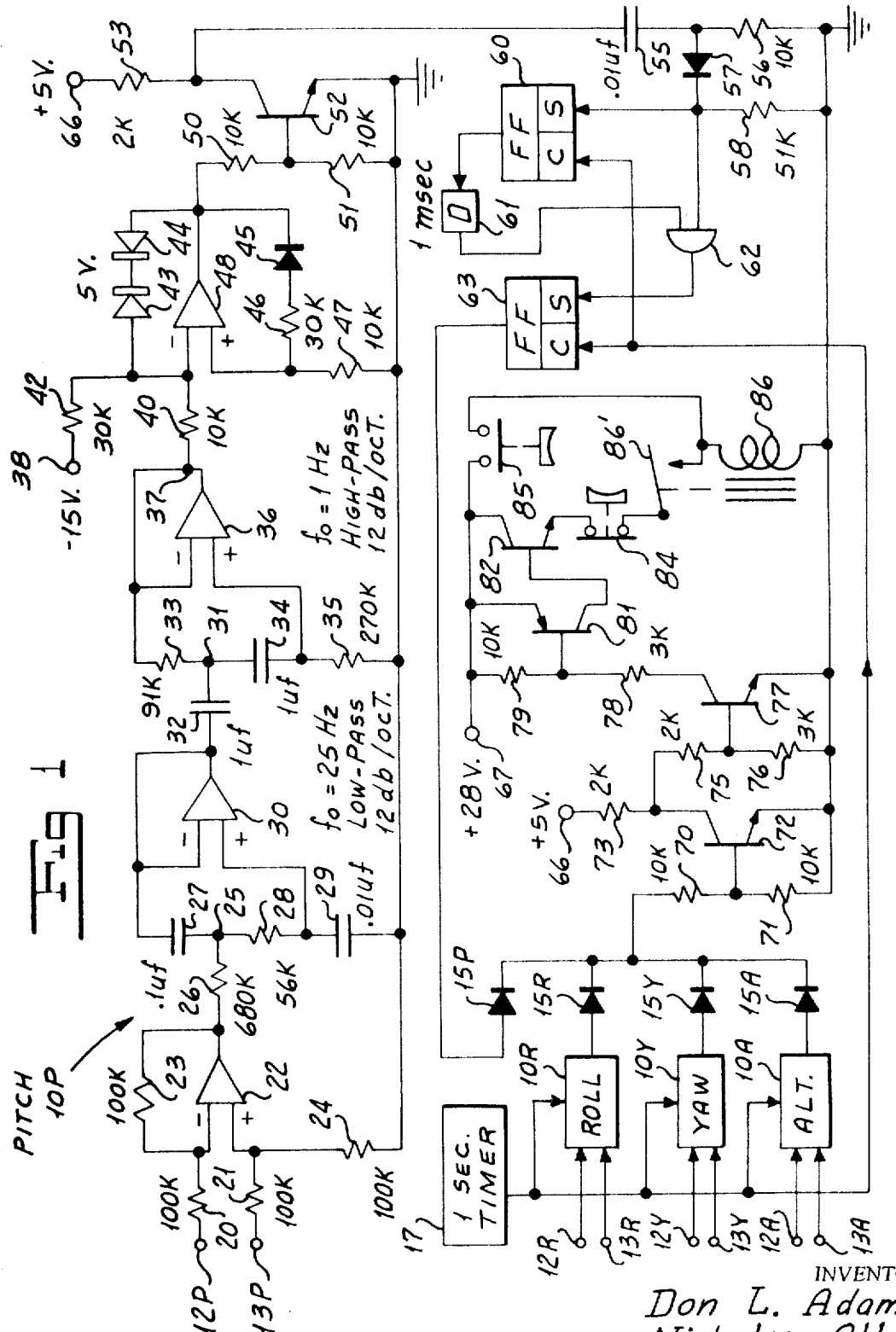

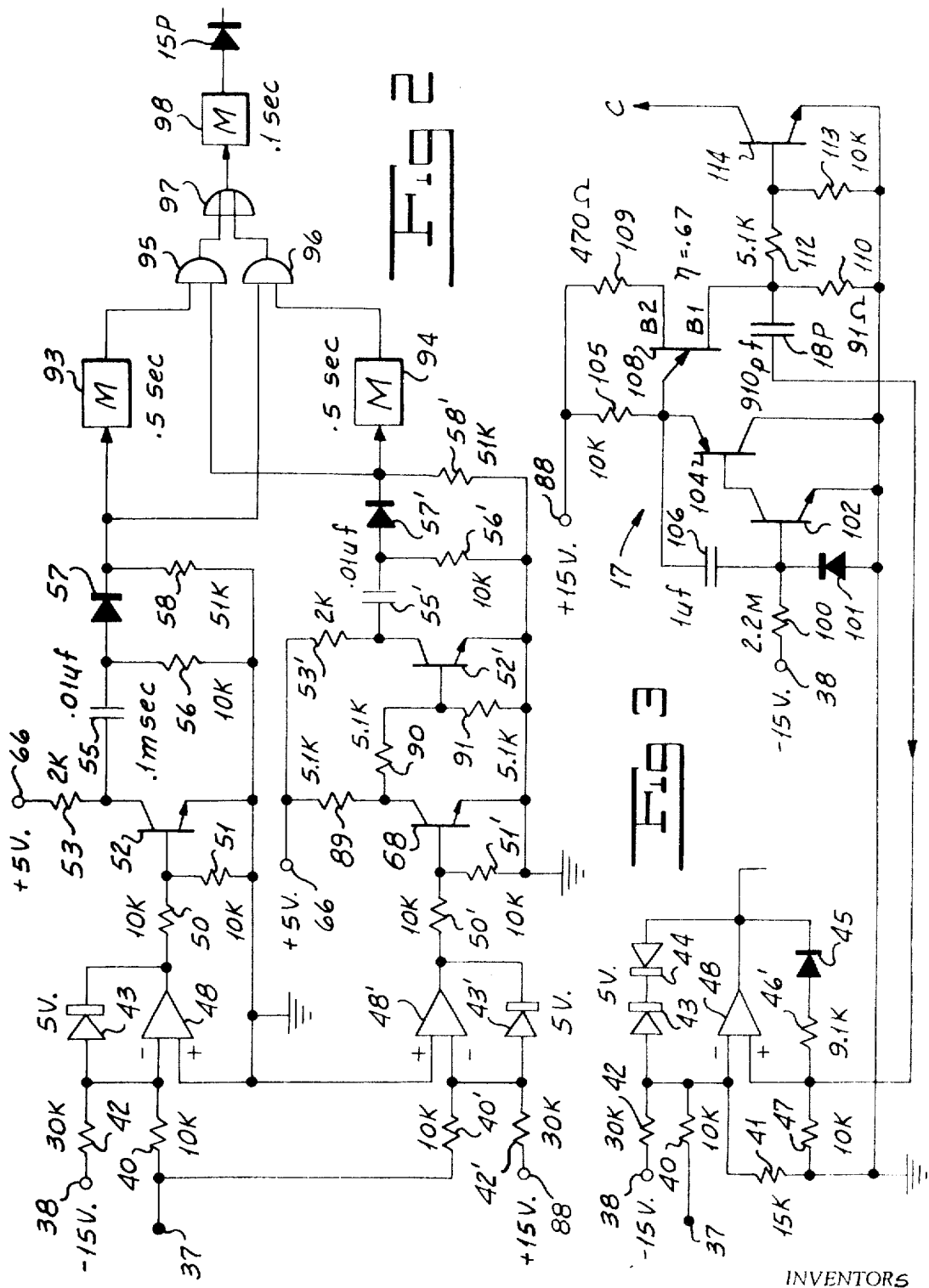

FLIGHT CONTROL DISABLING SYSTEM

SUMMARY OF THE INVENTION

One object of our invention is to provide a flight control disabling system in which measurement is made of the amplitude and frequency of error signals in the various flight control channels of the system.

Another object of our invention is to provide a flight control disabling system which detects the presence in any channel of an oscillatory error signal exceeding a certain amplitude and lying within a predetermined frequency band.

A further object of our invention is to provide a system in which such detected oscillatory error signals are employed to disable either a single channel or the entire flight control system.

Other and further objects of our invention will appear from the following description.

BRIEF DESCRIPTION OF THE DRAWINGS

In the accompanying drawings which form part of the instant invention and are to be read in conjunction therewith and in which like reference numerals are used to indicate like parts in the various views:

FIG. 1 is a schematic view illustrating a first embodiment of our invention;

FIG. 2 is a fragmentary schematic view illustrating a second embodiment of our invention;

FIG. 3 is a fragmentary schematic view illustrating the master timer circuit and its operation in conjunction with a third embodiment of our invention.

DESCRIPTION OF THE PREFERRED EMBODIMENT

Referring now more particularly to FIG. 1 of the drawings, an aircraft such as a helicopter is provided with a flight control system having the customary pitch, roll, yaw, and altitude control channels. Our system is accordingly provided with corresponding pitch, roll, yaw, and altitude disabling circuits indicated generally by the reference numerals 10P, 10R, 10Y, and 10A, respectively. Only the pitch disabling circuit 10P is shown in detail, since the construction of the roll disabling circuit 10R, the yaw disabling circuit 10Y, and the altitude disabling circuit 10A may be of similar construction.

The pitch channel of the flight control system provides balanced push-pull error or control signals at terminals 12P and 13P. Terminal 12P is coupled through a 100 K input resistor 20 to the negative input of a differential amplifier 22. Terminal 13P is coupled through a 100 K input resistor 21 to the positive input of differential amplifier 22, which input is grounded through a 100 K resistor 24. The output of differential amplifier 22 is coupled through a 100 K feedback resistor 23 to the negative input thereof.

The output of differential amplifier 22 is coupled through a 680 K resistor 26 to a terminal 25. Terminal 25 is serially connected through a 56 K resistor 28 and a 0.01 μf capacitor 29 to ground. The junction of resistor 28 and capacitor 29 is connected to the positive input of a differential amplifier 30. Terminal 25 is coupled through a 0.1 μf capacitor 27 to a negative input of differential amplifier 30 and to the output thereof. The output of differential amplifier 30 is coupled through a 1 μf capacitor 32 to a terminal 31. Terminal 31 is serially connected through a 1 μf capacitor 34 and a 270 K resistor 35 to ground. The junction of capacitor 34 and resistor 35 is connected to the positive input of a differential amplifier 36. Terminal 31 is coupled through a 91 K resistor 33 to a negative input of differential amplifier 36 and to the output thereof.

The output terminal 37 of differential amplifier 36 is coupled through a 10 K input resistor 40 to the negative input of a differential amplifier 38, which input is connected through a 30 K resistor 42 to a −15 volt source 38. The output of differential amplifier 48 is coupled to the negative input thereof through a pair of series-opposing 5 volt Zener diodes 43 and 44. The positive input of differential amplifier 48 is grounded through a 10 K voltage-dividing resistor 47. The output of differential amplifier 48 is connected to the cathode of a diode 45, the anode of which is coupled through a 30 K voltage-dividing feedback resistor 46 to the positive input of differential amplifier 48.

The output of differential amplifier 48 is coupled through a 10 K resistor 50 to the base of a transistor 52, which base is grounded through a 10 K resistor 51. The emitter of transistor 52 is grounded; and the collector thereof is coupled through a 2 K resistor 53 to a +5 volt source 66. The collector output of transistor 52 is serially connected to ground through a 0.01 μf capacitor 55 and a 10 K resistor 56. Capacitor 55 and resistor 56 form a differentiating circuit having a time-constant of 0.1 msec (as shown in FIG. 2). The junction of capacitor 55 and resistor 56 is coupled forwardly through a diode 57 to the setting input of a bistable flip-flop 60, which setting input is grounded through a 51 K resistor 58. The output of flip-flop 60 is coupled through a 1 msec delay network 61 to one input of an AND circuit 62. The cathode of diode 57 is applied to the other input of AND circuit 62; and the output thereof is applied to the setting input of a bistable flip-flop 63.

The roll channel of the flight control system provides balanced push-pull error signals at terminals 12R and 13R which are applied to the roll disabling circuit 10R. The yaw channel of the flight control system provides balanced push-pull error signals at terminals 12Y and 13Y which are applied to the yaw disabling circuit 10Y. The altitude channel of the flight control system provides balanced push-pull error signals 12A and 13A which are applied to the altitude disabling circuit 10A. A master timer 17 provides pulses at intervals of 1 sec which are applied to the clearing inputs of flip-flops 60 and 63 of the pitch disabling circuit and to clearing inputs of corresponding flip-flops associated with the roll, yaw, and altitude disabling circuits 10R, 10Y, and 10A.

The outputs of flip-flops 63 of the pitch, roll, yaw, and altitude disabling circuits are coupled forwardly through respective OR circuit diodes 15P, 15R, 15Y, and 15A to one terminal of a 10 K resistor 70. The other terminal of resistor 70 is connected to the base of a transistor 72 and is grounded through a 10 K resistor 71. The emitter of transistor 72 is grounded; and the collector thereof is coupled through a 2 K resistor 73 to +5 volt source 66. The collector of transistor 72 is coupled through a 2 K resistor 75 to the base of a transistor 77, which base is grounded through a 3 K resistor 76. The emitter of transistor 77 is grounded; and the collector thereof is coupled through a 3 K resistor 78 to the base of a transistor 81, which base is coupled through a 10 K resistor 79 to a +28 volt source 67. The emitter of transistor 81 is connected to +28 volt source 67; and the collector thereof is connected to the base of a transistor 82. The collector of transistor 82 is connected to +28 volt source 67; and the emitter thereof is serially connected through a normally closed, manually operable disabling switch 84, a normally open relay holding contact 86′, and a flight control system enabling relay winding 86 to ground. The +28 volt source 67 is coupled through a normally open, manually operable enabling switch 85 to the ungrounded terminal of relay winding 86.

Differential amplifier 22 converts the double-ended or push-pull error signals at terminals 12P and 13P into a single-ended output. Differential amplifier 30 in conjunction with resistors 26 and 28 and capacitors 27 and 29 comprises a low-pass filter having a cut-off frequency of 25 Hz which attenuates higher frequency signals at a roll-off rate of 12 db per octave. Differential amplifier 36 in conjunction with capacitors 32 and 34 and resistors 33 and 35 forms a high-pass filter having a cut-off frequency of 1 Hz which attenuates lower frequency signals at a roll-off rate of 12 db per octave. Differential amplifiers 30 and 36 with their associated frequency selective resistors and capacitors thus form a filter having a band-pass characteristic between 1 Hz and 25 Hz. Differential amplifier 48 in conjunction with its associated components forms a comparator circuit to detect outputs from the band-pass filter of a predetermined amplitude. Flip-flops 60 and 63 form a counting circuit to detect a predetermined number of cycles of oscillation.

In operation of the circuit of FIG. 1, the push-pull pitch channel error signals of the flight control system at terminals 12P and 13P are converted into a corresponding signal at the output of differential amplifier 22. For example, assume that the push-pull error signals at terminals 12P and 13P may range between +5 volts. If the input at terminal 13P is +5 volts, the input at terminal 12P will be —5 volts. With a +5 volt input at terminal 13P, equal resistors 21 and 24 cause +2.5 volts to appear at the positive input of differential amplifier 22. The output of differential amplifier 22 will rise to a potential of +10 volts. With an input at terminal 12P of —5 volts and an output from differential amplifier 22 of 10 volts, equal resistors 20 and 23 cause +2.5 volts to appear at the negative input of differential amplifier 22. It will be appreciated that, because of its high gain, differential amplifier 22 always operates with substantial equality of its positive and negative inputs. We shall assume that the maximum error signal which may be provided by any channel of the flight control system corresponds to ±10 volts at the output of differential amplifier 22. The low-pass filter including differential amplifier 30 attenuates all noise frequencies greater than 25 Hz, since the band width of the usual flight control system is appreciably less than this. The high-pass filter including differential amplifier 36 passes both oscillatory and transient signals of a frequency greater than 1 Hz. We have assumed that flight control error signals of a frequency less than 1 Hz represent normal operation, that error signals ranging between 1 Hz and 25 Hz may represent either normal transient operation or adverse oscillatory operation depending upon amplitude, and that signals of a frequency greater than 25 Hz represent merely noise.

It is desired to detect outputs from the band-pass filter including differential amplifiers 30 and 36 of an amplitude exceeding, for example, 50 percent of the maximum output of ±10 volts of differential amplifier 22. Differential amplifier 48 normally provides a positive output of approximately +5 volts. However, when the output of differential amplifier 36 exceeds +5 volts, the output of differential amplifier 48 suddenly switches to a negative potential. Assume the output of differential amplifier 36 is zero. Since amplifier 48 provides a positive output, diode 45 is non-conductive. No current flows through resistor 46; and resistor 47 maintains the positive input of differential amplifier 48 at ground potential. The output of differential amplifier 48 rises to a positive potential sufficient to increase the negative input of differential amplifier 48 to ground potential. Accordingly, the output of differential amplifier 48 will be +5.5 volts, comprising a 0.5 volt drop in forwardly biased diode 44 and a 5.0 volt drop in backwardly biased Zener diode 43. The current drawn through diodes 44 and 43 is 0.5 ma which is equal to the current through resistor 42.

As the output of differential amplifier 36 rises to a potential of +5 volts, the feedback current through diodes 44 and 43 decreases to zero; and the voltage drop of diode 44 also decreases to zero. Hence the output of differential amplifier 48 decreases slightly from +5.5 to +5.0 volts.

If the output of amplifier 36 exceeds +5 volts, the output of amplifier 48 will abruptly switch from +5.0 to —7.17 volts. Diode 45 is now conductive; and its forward drop of 0.5 volt results in a potential of —6.67 volts at its anode. Voltage-dividing resistors 46 and 47 thus produce —6.67/4 = —1.67 volts at the positive input of amplifier 48. The current flow through feedback diodes 43 and 44 is reversed, resulting in 0.5 volt across forwardly biased diode 43 and 5.0 volts across backwardly biased diode 44. The negative input of amplifier 48 is thus at a potential of —7.17 + 0.5 + 5.0 = —1.67 volts.

If the output of amplifier 36 now decreases to a potential of +3 volts, the feedback current through diodes 43 and 44 decreases to zero; and the voltage drop of diode 43 also decreases to zero. The potential at the negative input of amplifier 48 rises slightly from —1.67 to —1.5 volts. The output of amplifier 48 rises slightly from —7.17 to —6.5 volts; and the positive input of amplifier 48 rises from —1.67 to —1.5 volts.

If the output of amplifier 36 decreases below +3 volts, the output of amplifier 48 will abruptly switch from —6.5 volts to approximately +5.5 volts. It will be appreciated that resistors 46 and 47 in conjunction with diode 45 form a holding circuit for amplifier 48 which introduces appreciable hysteresis in the input triggering voltages. The output of amplifier 48 switches from positive to negative for inputs at terminal 37 exceeding +5 volts; while the output of amplifier 48 switches from negative to positive for inputs at terminal 37 less than +3 volts. The purpose of this hysteresis is to prevent residual noise from causing multiple switching of amplifier 48 as a transient or oscillatory input at terminal 37 passes through a value of +5.0 volts.

With a positive output from amplifier 48, transistor 52 is conductive; and its collector is substantially at ground potential. When the output of amplifier 48 switches from positive to negative, transistor 52 is rendered non-conductive; and its collector voltage abruptly increases to +5 volts. A positive pulse is coupled through differentiating capacitor 55 and diode 57 to set flip-flop 60. After a delay of 1 msec provided by network 61, flip-flop 60 partially enables AND circuit 62.

When the output of amplifier 48 switches from negative to positive, a negative pulse is produced by differentiating circuit 55–56. However, this negative pulse is blocked by diode 57 and has no effect. When the output of amplifier 48 again switches from positive to negative, a positive pulse is coupled through diode 57 and the partially enabled AND circuit 62 to set flip-flop 63.

It will be noted that timer 17 periodically clears or re-sets flip-flop 60 at 1 second intervals. Accordingly flip-flop 63 can be set only if within a 1 second interval the signal at output terminal 37 of amplifier 36 first rises above +5 volts, then decreases below +3 volts, and then again rises above +5 volts. Flip-flop 60 is set upon the first excessive positive excursion of the signal at terminal 37; and flip-flop 63 is set if a second excessive positive excursion occurs within a 1 second interval.

It will be noted that the 0.1 msec time-constant of differentiating circuit 55–56 is appreciably less than the 1 msec delay of network 61. This insures that AND circuit 62 is not partially enabled until the first pulse from differentiating circuit 55–56 has completely decayed. Delay network 61 thus prevents flip-flop 63 from being set by the first pulse from differentiating circuit 55–56.

Flip-flop 63 of the pitch disabling circuit 10P will be set if there exists at terminal 37 an oscillatory signal of a peak amplitude in excess of 5 volts and of a frequency greater than 1 Hz. The output of flip-flop 63 of the pitch disabling circuit 10P is applied to the anode of OR circuit diode 15P. The disabling circuits 10R, 10Y, and 10A for the other channels may function similarly to apply outputs to the anodes of OR diodes 15R, 15Y, and 15A. An output from any one of disabling circuits 10 is coupled through a corresponding OR circuit diode 15 to render transistor 72 conductive.

Normally transistor 72 is non-conductive; and transistors 77, 81, and 82 are conductive. The flight control system is enabled by momentarily depressing switch 85. This energizes relay winding 86, which closes holding contact 86'. Holding current for winding 86 flows through transistor 82, switch 84, and holding contact 86'. Relay winding 86 actuates four additional relay contacts 86P, 86R, 86Y, and 86A (not shown) which, respectively, enable the pitch, roll, yaw, and altitude channels of the flight control system. The flight control system may be manually disabled by momentarily depressing switch 84. This interrupts the holding circuit; and relay winding 86 is disabled. Holding contact 86' opens; and when switch 84 is released, winding 86 remains disabled.

When transistor 72 is rendered conductive in response to an output from one of the disabling circuits 10, transistors 77, 81, and 82 become non-conductive. When transistor 82 is rendered non-conductive, the holding circuit for relay winding 86 is interrupted. Winding 86 is disabled; and relay contact 86' opens. Timer 17 will re-set flip-flops 63 of the various disabling circuits 10 at one second intervals. Transistor 72 will thus be rendered non-conductive and transistors 77, 81, and 82 will again be rendered conductive. However, since holding contact 86' is open, relay winding 86 will not be energized unless the enabling switch 85 is again momentarily depressed.

We have shown the use of OR circuit diodes 15 to actuate a single relay winding 86 which controls all four channels of the flight control system. However, it will be appreciated that the various channels of the flight control system may be individually enabled and disabled. In such event, four circuits each including components 70 through 86 would be provided; OR circuit diodes 15 would be omitted; and the outputs of flip-flops 63 of the various disabling circuits 10 would be directly applied to corresponding resistors 70 of the four circuits including components 70 through 86. An output from flip-flop 63 of one of the disabling circuits would then disable only that channel of the flight control system which exhibits oscillatory operation while leaving the remaining channels of the flight control system unaffected.

Referring now to FIG. 2 which shows a second embodiment of our invention, output terminal 37 of amplifier 36 is coupled through resistor 40 to the negative input of amplifier 48 and is also coupled through a 10K resistor 40' to the negative input of a differential amplifier 48'. The positive inputs of amplifiers 48 and 48' are grounded. The negative input of amplifier 48 is coupled forwardly through a 5 volt Zener diode 43 to the output thereof; and the negative input of amplifier 48' is coupled forwardly through a 5 volt Zener diode 43' to the output thereof. The negative input of differential amplifier 48' is coupled through a 30 K resistor 42' to a +15 volt source 88. The output of differential amplifier 48' is coupled through a 10 K resistor 50' to the base of a grounded emitter transistor 68. The base of transistor 68 is grounded through a 10 K resistor 51'. The collector of transistor 68 is coupled through a 5.1 K resistor 89 to +5 volt source 66. The collector of transistor 68 is coupled through a 5.1 K resistor 90 to the base of a grounded emitter transistor 52'. The base of transistor 52' is grounded through a 5.1 K resistor 91; and the collector of transistor 52' is coupled through a 2 K resistor 53' to +5 volt source 66. The collector of transistor 52' is coupled through a 0.01 μf capacitor 55' to the anode of a diode 57' which is grounded through a 10 K resistor 56'. The cathode of diode 57' is grounded through a 51 K resistor 58'. Capacitor 55' and resistor 56' form a differentiating circuit having a time-constant of 0.1 msec. The cathode of diode 57 is applied to one input of an AND circuit 96 and triggers a monostable multivibrator 93 which provides an output pulse of 0.5 sec duration. The cathode of diode 57' is applied to one input of an AND circuit 95 and triggers a monostable multivibrator 94 which provides an output pulse of 0.5 sec duration. The output of multivibrator 93 is connected to the other input of AND circuit 95; and the output of multivibrator 94 is connected to the other input of AND circuit 96. The outputs of AND circuits 95 and 96 are applied to an OR circuit 97, the output of which triggers a monostable multivibrator 98 which provides an output pulse of 0.1 sec duration. Multivibrator 98 is coupled forwardly through one of OR circuit diodes 15 where only one relay winding 86 is employed to disable all channels of the flight control system. Alternately, if four relay windings 86 are provided, the output of multivibrator 98 may be directly coupled through resistor 70 to the base of a corresponding one of transistors 72. In FIG. 2, the timing for each of the disabling circuits is internally provided by multivibrators 93 and 94; and no master timer 17 is required.

In operation of the circuit of FIG. 2, if the input at terminal 37 is zero, amplifier 48 provides a +5 volt output by virtue of backwardly biased Zener diode 43; and amplifier 48' provides an output of approximately −0.5 volt by virtue of forwardly biased Zener diode 43'. If the input at terminal 37 increases above +5 volts, the output of differential amplifier 48 will abruptly switch from +5 volts to −0.5 volt where Zener diode 43 is now forwardly biased. If the input at terminal 37 decreases below −5 volts, the output of differential amplifier 48' will abruptly switch from −0.5 volt to +5 volts where Zener diode 43' is backwardly biased. Differential amplifiers 48 and 48' together with their associated components thus detect inputs at terminal 37 exceeding ±5 volts.

With a positive output from amplifier 48, transistor 52 is conductive; and its collector is substantially at ground potential. When the output of amplifier 48 switches from positive to negative, transistor 52 is rendered non-conductive and a positive pulse is coupled through differentiating capacitor 55 and diode 57. With a negative output from amplifier 48', transistor 68 is non-conductive; transistor 52' is conductive; and the collector of transistor 52' is substantially at ground potential. When the output of amplifier 48' switches from negative to positive, transistor 68 is rendered conductive; transistor 52 is rendered non-conductive; and a positive pulse is coupled through differentiating capacitor 55' and diode 57'.

If the input at terminal 37 first rises above +5 volts, then the positive pulse coupled through diode 57 will trigger multivibrator 93 to partially enable AND circuit 95. If, within a 0.5 second interval, the input at terminal 37 then drops below −5 volts, the positive pulse coupled through diode 57' will be applied through the partially enabled AND circuit 95 and OR circuit 97 to trigger multivibrator 98. Multivibrator 98 provides an output pulse of sufficient duration to ensure that relay winding 86 is disabled so that its holding contact 86' is opened.

If the input at terminal 37 first drops below −5 volts, then the positive pulse coupled through diode 57' will trigger multivibrator 94 to partially enable AND circuit 96. If, within a 0.5 second interval, the input at terminal 37 then rises above +5 volts, the positive pulse coupled through diode 57 will be applied through the partially enabled AND circuit 96 and OR circuit 97 to trigger multivibrator 98, which disables either the master relay 86 for all flight control channels or the corresponding relay 86 of that channel of the flight control system which exhibits improper operation.

It will be seen that multivibrator 98 is triggered if, within a 0.5 second interval, the input at terminal 37 varies either from +5 volts to −5 volts or from −5 volts to +5 volts. Thus we detect excessive positive and negative excursions of the error signal at terminal 37. Since this represents only one-half cycle of oscillation, multivibrators 93 and 94 provide pulses of only 0.5 sec duration. The circuit of FIG. 2 thus responds to oscillatory frequencies greater than 1 Hz. If the frequency is less than 1 Hz, the interval between excessive positive and negative excursions will exceed 0.5 second, so that multivibrators 93 and 94 will no longer partially enable AND circuits 95 and 96; and multivibrator 98 can not be triggered. No holding circuits are required for differential amplifiers 48 and 48', since alternate positive and negative or alternate negative and positive inputs at terminal 37 are detected. Multiple triggerings of differential amplifier 48 due to noise as the input at terminal 37 passes through +5 volts or of differential amplifier 48' as the input at terminal 37 passes through −5 volts cannot produce an output from either of AND circuits 95 and 96.

Referring now to FIG. 3, we have shown an alternate comparator for use in the circuit of FIG. 1 which detects inputs at terminal 37 in excess of +5 volts and less than −5 volts. The negative input of differential amplifier 48 is coupled to ground through a 15 K resistor 41; and the holding circuit now includes a 9.1 K resistor 46'. If the error signal at terminal 37 is zero, amplifier 48 provides a positive output of +5.5 volts. As the output of differential amplifier 36 rises to a potential of +5 volts, the output of differential amplifier 48 decreases slightly from +5.5 to +5.0 volts. If the input at terminal 37 exceeds +5 volts, the output of amplifier 48 will abruptly switch from +5 volts to −11.0 volts; and the potentials at both the positive and negative inputs of amplifier 48 will drop from ground to −5.5 volts. As the input at terminal 37 decreases from +5 volts to −5 volts, the output of amplifier 48 will increase slightly from −11.0 to −10.0 volts; and both the positive and negative inputs of the amplifier will increase slightly from −5.5 to −5.0 volts. If the input at terminal 37 decreases below −5 volts, the output of amplifier 48 will abruptly switch from −10.0 volts to approximately +5.5 volts.

In the master timer circuit 17 of FIG. 3, the −15 volt source 38 is coupled through a 2.2 M resistor 100 to the base of an inverting amplifier transistor 102, the emitter of which is grounded. The base of transistor 102 is coupled backwardly through a diode 101 to ground. The collector of transistor 102 is connected to the base of an emitter follower transistor 104, the collector of which is grounded. The emitter of transistor 104 is connected through a 1 μf feedback capacitor 106 to the base of transistor 102 and is connected through a 10 K resistor 105 to +15 volt source 88. The emitter output of transistor 104 is connected to the emitter of a unijunction transistor 108. The base-two contact of transistor 108 is connected through a 470 ohm resistor 109 to +15 volt source 88. The base-one contact of transistor 108 is connected through a 91 ohm resistor 110 to ground. Unijunction transistor 108 may have an intrinsic stand-off ratio of 0.67, for example. The base-one contact of transistor 108 is connected through a 5.1 K resistor 112 to the base of a transistor 114, the emitter of which is grounded. The base of transistor 114 is connected to ground through a 10 K resistor 113. The collector of transistor 114 is connected to the clearing inputs of flip-flops 60 and 63 of the pitch disabling circuit and to clearing inputs of corresponding flip-flops associated with the roll, yaw, and altitude disabling circuits as shown in FIG. 1.

In operation of the timing circuit 17, transistors 102 and 104 in conjunction with input resistor 100 and feedback capacitor 106 function as an integrator which develops a rising ramp voltage at the emitter of unijunction transistor 108. When transistor 108 fires, capacitor 106 is discharged through the emitter and base-one contact of transistor 108, resistor 110, and diode 101. The positive output pulse across resistor 110 is applied to transistor 114 which renders it momentarily conductive. This grounds the clearing inputs of counting flip-flops 60 and 63, thus re-setting them.

With an intrinsic stand-off ratio of 0.67 for unijunction transistor 108 and an applied potential at terminal 88 of 15 volts, transistor 108 will fire when its emitter reaches a potential of 0.67(15)+0.5 = 10.5 volts. Upon firing of transistor 108, capacitor 106 will discharge to a potential of approximately 3 volts, comprising 2.5 volts between the emitter and base-one contact of transistor 108 and 0.5 volt across the forwardly biased diode 101. When the discharge of capacitor 106 terminates, the base of transistor 102 rises from a potential of −0.5 volt to a potential of +0.5 volt which renders the integrator operative. The input voltage across resistor 100 is thus 15.5 volts. The time-constant of resistor 100 and capacitor 106 is 2.2 seconds. Thus, in a 1 second interval, the voltage across capacitor 106 will increase by 15.5/2.2 = 7.0 volts from 3 to 10 volts. Since the negative terminal of capacitor 106 is at a potential of +0.5 volt, the positive terminal thereof and hence the emitters of transistors 104 and 108 will, during a 1 second interval, increase in potential from 3.5 to 10.5 volts. At this time, unijunction transistor 108 fires, discharging capacitor 106 to 3 volts again.

The base-one output of unijunction transistor 108 is coupled through a 910 pf capacitor 18P to the positive input of differential amplifier 48. Capacitor 18P and resistor 47 act as a differentiating circuit, having a time-constant of 9.1 usec which is small compared with the 91 usec discharge time-constant of capacitor 106 through resistor 110. When the unijunction transistor fires at 1 second intervals, the positive pulse across resistor 110 produces an extremely short duration positive pulse at the positive input of differential amplifier 48. It will be appreciated that the comparator of FIG. 3 acts as a bistable flip-flop and will retain its existing output so long as the input at terminal 37 does not exceed ±5 volts. The re-set pulse coupled through differentiating capacitor 18P insures that, at the beginning of each time interval, amplifier 48 of FIG. 3 provides the same positive output as differential amplifier 48 of FIG. 1. It will be understood that additional capacitors 18R, 18Y, and 18A (not shown) are provided to re-set corresponding amplifiers 48 of the roll, pitch, and altitude disabling circuits. With such construction, the output of amplifier 48 will switch from positive to negative if the input at terminal 37 exceeds +5 volts, thus setting flip-flop 60. The output of amplifier 48 will switch from negative to positive again if the input at terminal 37 decreases below −5 volts. If the input at terminal 37 now increases to more than +5 volts, the output of differential amplifier 48 will switch from positive to negative, thus setting flip-flop 63 which provides a disabling signal through diode 15P.

The circuit of FIG. 2 disables an appropriate channel or the entire flight control system after one half-cycle of oscillation. The circuits of FIGS. 1 and 3 disable the flight control system after two half-cycles of oscillation. It will be appreciated that we may lengthen the number of half-cycles of oscillation required to disable the flight control system. For example, in the circuit of FIG. 3, differential amplifier 48 may be re-set to provide a negative output when transistor 108 fires. This may be accomplished by connecting capacitor 18P to the base-two contact rather than the base-one contact as shown. Alternatively, capacitor 18P may couple the base-one contact of transistor 108 to the negative input of differential amplifier 48 rather than to the positive input as shown. With the output of amplifier 48 negative, transistor 52 (FIG. 1) will be non-conductive and the collector thereof will be at a positive potential. If the input at terminal 37 decreases below −5 volts, the output of differential amplifier 48 will switch from negative to positive, thus rendering transistor 52 conductive. The collector of transistor 52 drops to ground potential and a negative pulse is produced across differentiating resistor 56. However, diode 57 blocks this negative pulse, so that flip-flop 60 is not set. When the input at terminal 37 increases above +5 volts, the output of differential amplifier 48 switches from positive to negative, thus setting flip-flop 60. If the input at terminal 37 decreases below −5 volts, the output of differential amplifier 48 switches from negative to positive. When the input at terminal 37 again rises above +5 volts, the output of differential amplifier 48 switches from positive to negative, thus setting flip-flop 63 which provides a disabling signal through diode 15P. This sequence of events requires three half-cycles of oscillation. Accordingly, the master timer 17 should provide re-set pulses at intervals of 1.5 seconds instead of only 1 second. This may be readily accomplished either by increasing resistor 100 from 2.2 to 3.3 M or by increasing capacitor 106 from 1 to 1.5 μf. Alternately, the magnitudes of both resistor 100 and capacitor 106 may be increased to provide a time-constant of 3.3 seconds.

It will be appreciated that we may disable the flight control system or an appropriate channel thereof after any desired number of half-cycles of oscillation. A large number of half-cycles prevents any inadvertent disabling due to wind gusts, but results in a larger amplitude of oscillation at the time of disabling where the control system is malfunctioning. A small number of half-cycles reduces the amplitude of oscillation at the time of disabling where the control system is malfunctioning, but may permit an occasional inadvertent disabling due to recurrent wind gusts. Since the primary purpose of the disabling circuit is to prevent a malfunctioning flight control system from placing the aircraft in a dangerous attitude or producing excessive load factors, the number of half-cycles of oscillation should not exceed three or perhaps four. We have found that two half-cycles of oscillation yield good results in practice.

It will be seen that we have accomplished the objects of our invention. We sense the amplitudes and frequencies of the error or control signals in the various channels of the flight control system. We detect the presence of an oscillatory error signal exceeding a certain amplitude and lying within a predetermined frequency band and disable either that channel providing the oscillatory signal or the entire flight control system.

It will be understood that certain features and subcombinations are of utility and may be employed without reference to other features and subcombinations. It will be further understood that various changes may be made in details without departing from the spirit of our invention.

Having thus described our invention, what we claim is:

1. A disabling circuit for a control system providing a control signal including in combination amplitude discriminating means responsive to said control signal for detecting signals exceeding a predetermined magnitude, frequency discriminating means responsive to the detecting means for sensing detected signals exceeding a certain frequency, and means responsive to the sensing means for disabling that portion of said control system providing said control signal.

2. A disabling circuit as in claim 1 wherein the disabling means comprises means for disabling a further portion of said control system.

3. A disabling circuit as in claim 1 wherein the sensing means comprises a counting device and means for periodically clearing the counting device.

4. A disabling circuit as in claim 1 wherein the sensing means comprises a plurality of mono-stable multivibrators.

5. A disabling circuit as in claim 1 in which said control system provides a reversible polarity control signal wherein the amplitude discriminating means comprises means for detecting both positive and negative polarity signals exceeding said predetermined magnitude.

6. A disabling circuit as in claim 1 in which said control system provides an oscillatory control signal wherein the sensing means comprises means for counting a predetermined number of half-cycles of oscillation.

7. A disabling circuit as in claim 6 wherein the construction of the sensing means is such that said predetermined number of half-cycles is at least one but not more than four.

8. A disabling circuit as in claim 1 which further includes a low-pass filter which attenuates signals exceeding a predetermined frequency and means including said filter for coupling the control signal to the detecting means.

9. A disabling circuit as in claim 1 which further includes a high-pass filter which attenuates signals less than said certain frequency and means including the filter for coupling said control signal to the detecting means.

10. A disabling circuit as in claim 1 which further includes a band-pass filter and means including said filter for coupling the control signal to the detecting means.

11. A disabling circuit for a control system providing a plurality of independent control signals including in combination amplitude discriminating means, frequency discriminating means, means responsive to only one of said control signals and comprising both discriminating means for detecting oscillations of said one control signal exceeding a predetermined amplitude and lying within a predetermined frequency band, and means responsive to the detecting means for disabling that portion of said control system providing said one control signal.

12. In a control system providing a plurality of independent control signals, means responsive to only one of said control signals for detecting oscillations of said one control signal lying within a predetermined frequency band and exceeding a predetermined amplitude, means for disabling that portion of said control system providing said one control signal, and means responsive to the detecting means for actuating the disabling means.

13. In a control system providing independent first and second control signals, first means responsive to only the first of said control signals for detecting oscillations of the first control signal lying within a predetermined frequency band and exceeding a predetermined amplitude, second means responsive to only the second of said control signals for detecting oscillations of the second control signal lying within a certain frequency band and exceeding a certain amplitude, means responsive to the first detecting means for disabling at least that portion of said control system providing the first control signal, and means responsive to the second detecting means for disabling at least that portion of said control system providing the second control signal.

14. A disabling circuit for a control system providing a control signal including in combination means responsive to the control signal for providing an output pulse upon each occasion that the control signal exceeds a predetermined magnitude, means responsive to the pulse means and operable upon the occurrence of at least two output pulses within a predetermined time interval for providing an output signal, and means responsive to the output signal for disabling that portion of the control system providing the control signal.

15. A disabling circuit as in claim 14 in which said control signal is of reversible polarity and in which the pulse means comprises means providing an output pulse for both positive and negative polarity control signals exceeding said predetermined magnitude.

16. A disabling circuit as in claim 14 which further includes a band-pass filter and means including the filter for coupling the control signal to the pulse means.

* * * * *